United States Patent [19]
McKinney

[11] 3,717,052
[45] Feb. 20, 1973

[54] AUTOMATIC GRINDING MACHINE

[76] Inventor: Jonathan R. McKinney, 4831 S. W. 11th Court, Plantation, Fla.

[22] Filed: June 14, 1971

[21] Appl. No.: 152,936

[52] U.S. Cl. ................................................76/48 R
[51] Int. Cl. ...........................................B23d 63/08
[58] Field of Search..................76/41, 43, 44, 45, 48

[56] References Cited

UNITED STATES PATENTS

| 1,051,153 | 1/1913 | Nelson | 76/48 |
|---|---|---|---|
| 2,637,223 | 5/1953 | Gustin | 76/48 |
| 2,941,425 | 6/1960 | Drake | 76/48 |
| 3,616,711 | 11/1971 | Daggett | 76/48 |

Primary Examiner—Harrison L. Hinson
Attorney—Eugene F. Malin

[57] ABSTRACT

An automatic grinding machine for simultaneously grinding both sides of tungsten carbide tips on a circular saw blade to provide a compound side clearance angle. The compound side clearance angle includes a tangential side clearance and a radial side clearance on each side of each tungsten carbide tip. The grinding machine includes two spindle arms supported on a guide means and reciprocally movable on the guide means and moveable toward and away from one another, a rotatable grinding wheel connected to the distal end of each spindle arm, a moveable clearance cam positioned between the distal ends of the spindle arms and reciprocally moveable along a path at a predetermined angle to the guide rod, clearance cam follower means on each spindle arm, an adjustable indexing means for indexing and locating the carbide tipped saw blade in the proper grinding position, and drive means for driving the reciprocally moveable spindle arms, the clearance can, the grinding wheels to grinding tungsten carbide tips, and the indexing means.

7 Claims, 7 Drawing Figures

JOHNATHAN R. McKINNEY
INVENTOR.

AUTOMATIC GRINDING MACHINE

BACKGROUND OF THE INVENTION

This invention relates to an automatic grinding machine for economically grinding the sides of tungsten carbide tips on circular saw blades to provide duplicate tangential side clearance and duplicate radial side clearance, and, more particularly, to an automatic grinding machine that includes two reciprocally moveable spindle arms adjustable toward and away from one another with grinding wheels at the distal ends of the spindle arms, and a reciprocally moveable clearance cam between the distal ends of the spindle arms for guiding the grinding wheels over the tungsten carbide tips to provide the desired tangential clearance.

BACKGROUND OF THE INVENTION

This invention relates to an automatic grinding machine for economically grinding the sides of tungsten carbide tips on circular saw blades to provide duplicate tangential side clearance and duplicate radial side clearance, and, more particularly, to an automatic grinding machine that includes two reciprocally moveable spindle arms adjustable toward and away from one another with grinding wheels at the distal ends of the spindle arms, and a reciprocally moveable clearance cam between the distal ends of the spindle arms for guiding the grinding wheels over the tungsten carbide tips to provide the desired tangential clearance.

BRIEF SUMMARY OF THE INVENTION

An automatic grinding machine for simultaneously grinding both sides of tungsten carbide tips on a circular saw blade to provide a compound side clearance angle. In the preferred embodiment the grinding machine includes two reciprocally moveable pendulum-type spindle arms rotatably supported on a single guide rod above the work area, a rotatable grinding wheel connected to a spindle in the distal end of each spindle arm, a reciprocally moveable clearance cam positioned between the lower distal ends of the spindle arms and moveable in a line at a predetermined angle nearly parallel to the axis of the guide rod, a cam follower connected to each spindle arm positioned to follow the cam surface of the clearance cam, a saw blade holder, an indexing mechanism for indexing and locating each carbide tipped tooth in relation to the grinding wheels, and a control system including drive means for driving the spindle arms at an adjustable rate through each grinding, sparkout, and return cycle, for driving the clearance cam at an adjustable rate through the single cycle for each tungsten carbide tip, and for driving the indexing mechanism. With each reciprocating movement of the spindle arm, the grinding wheels bite further into the sides of the carbon tip as a result of the movement of the clearance cam. The reciprocal movement of the spindle arms continues until the clearance cam completes it's single cycle. Thereafter, the control system allows the grinding heads to continue reciprocating over the carbide tips for an adjustable time period to effect a "spark out" which results in each successive carbide tip being ground to a duplicate size. Then the control system actuates means to retract the grinding heads from the grinding position while the clearance cam is moving to it's starting position. The index mechanism then advances the next carbide tooth to a grinding position before the cycle of operation of the grinding wheel spindle arms and the clearance cam repeats the grinding operation.

It is an object of this invention to provide a non-complex machine for grinding compound side clearance on the tungsten carbide tips on circular saw blades.

Another object of this invention is to provide a grinding machine that includes two reciprocally moveable grinding wheel spindle arms that are mounted for movement toward and away from one another and a wedged shaped moveable clearance cam for regulating the precise position of the spindle arms during each cycle of the spindle arms.

A further object of this invention is to provide a low cost fast-acting grinding machine for carbide tipped circular saws having an indexing mechanism for indexing and locating the tungsten carbide tipped teeth in the proper grinding position.

A further object of this invention is to provide a tungsten carbide tip grinding machine that is easily adjusted for grinding each tooth.

A further object of this invention is to provide an adjustable reciprocally moveable grinding wheel that interacts with an adjustable reciprocally moveable cam for controlling the grinding of saw blades.

An additional object of this invention is to provide an adjustable indexing mechanism and a cam arrangement to cause the indexing mechanism to follow the circumferencial shape of various diameter circular saw blades.

In accordance with these and other objects which will be apparent hereinafter, the instant invention will now be described with particular reference to the accompanying drawings.

PREFERRED EMBODIMENT OF THE INVENTION

Figure 1:
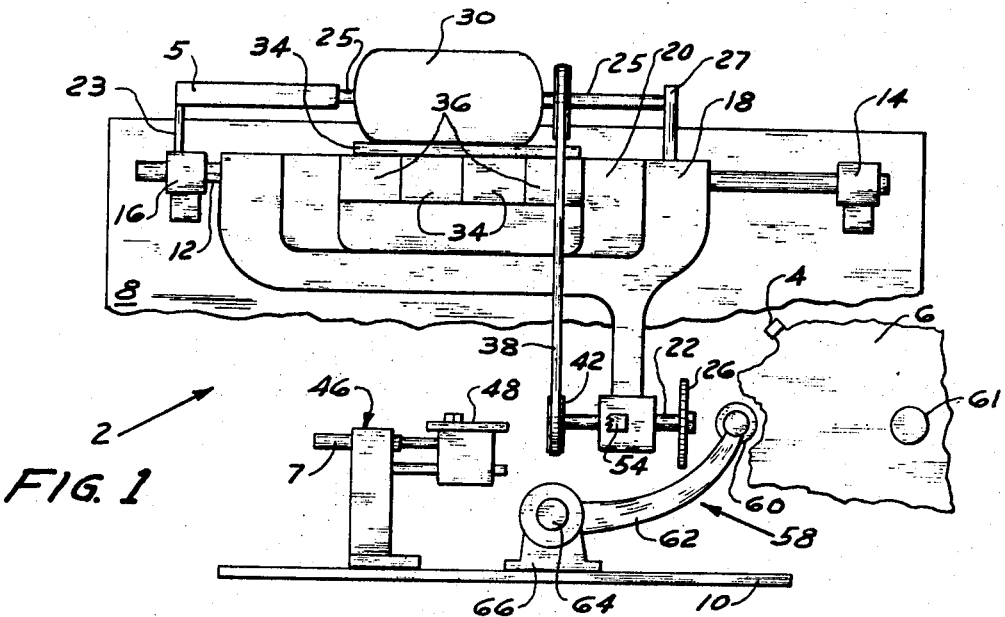
FIG. 1 is a side view partially cutaway showing the main mechanical components of the automatic grinding machine.
Figure 2:
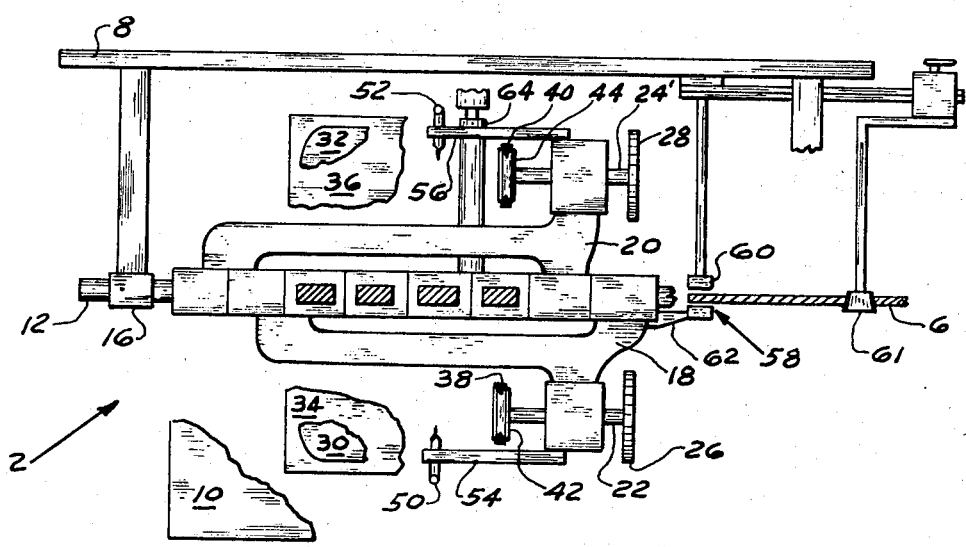
FIG. 2 is a top view partially cutaway showing the many of the main mechanical components of the automatic grinding machine shown in FIG. 1.

Referring now to one preferred embodiment of the invention and particularly to FIG. 1 and 2, the automatic grinding machine, generally designated by numeral 2, is used to simultaneously grind both sides of a tungsten carbide tip 4 held on a circular saw blade 6 by member 7. The grinding operation provides a compound side clearance angle with duplicate tangential side clearance and duplicate radial side clearance on each side of the tungsten carbon tip. The grinding machine 2 includes a vertical frame member 8 being supported by a horizontal base member 10. A single guide rod 12 is supported on frame 8 by guide rod support arms 14 and 16. Two reciprocally moveable pendulum-type spindle arms 18 and 20 are rotatably supported on the guide rod 12 for movement toward and away from one another. The grinding wheel spindles 22 and 24 are rotatably connected in the distal ends of spindle arms 18 and 20 respectively. Grinding wheels 26 and 28 are connected to the end of the rotatable spindles 22 and 24 respectively. Drive motors 30 and 32 for rotating the grinding wheels are supported on motor bases members 34 and 36. The motor base members 34 and 36 are also reciprocally connected to the guide rod 12. Drive belts 38 and 40 are connected between the drive motors 30 and 32 and the spindle pulleys 42 and 44 on the spindle arms 18 and 20. Motors 30 and 32, motor mounts 34 and 36, and the belts are reciprocated by spindle arm cylinder 5 mounted on member 23 attached to support arm 16. The moveable shaft 25 is fixed at it's distal end to member 27 fixed to spindle arm 18.

A reciprocally moveable clearance and infeed cam means, generally designated by numeral 46, is supported on the base member 10 between the lower ends of said spindle arms 18 and 20. The wedged shaped cam means includes a two-faced cam. Two adjustable cam followers 50 and 52 are connected to said spindle arms 18 and 20 by mounting supports 54 and 56. The cam followers 50 and 52 engage each respective cam face of the clearance cam 48.

Figure 7:
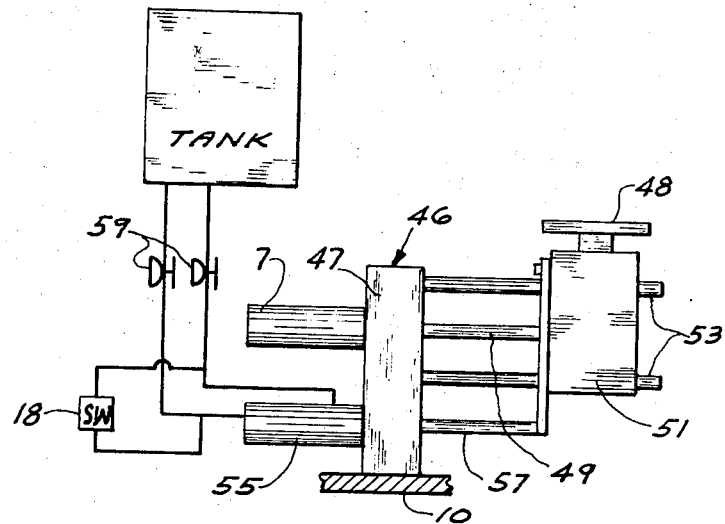
FIG. 7 is a side view of the clearance cam mechanism and an oil control cylinder.

Referring now to FIG. 7, the clearance and infeed cam mechanism 46 referred to hereafter as the clearance cam mechanism includes cam 48 mounted on moveable cam holder 51. The cam holder 51 is driven back and forth by the cam cylinder 7 and cam holder slide rods 53 that are connected to post 47 mounted on base plate 10. The piston shaft 49 is connected to the cam holder 51 to reciprocate the cam 48. The speed of movement of the cam 48 is regulated by oil control cylinder 55. A moveable piston (not shown) is mounted in cylinder 55 with a piston shaft 57 connected to one side of the piston. The other end of the piston shaft 57 is connected to cam holder 51. The oil from the tank is moved back and forth through pipelines connected between the tank and oil cylinder 55. Adjustable fluid flow regulators 59 in each line are used to adjust the fluid flow rate and control the speed of the reciprocating cam 48.

Oil control cylinders and regulators may be connected to the spindle arm mechanisms, and the index mechanism to control the reciprocal speed of each mechanism. The illustration in FIG. 7 shows a switch 180 that may be connected between the oil lines to operate a by-pass system when it is desirable to bypass the oil flow control valves 59. The by-pass may be used to speed up the movement of the spindle arms or other mechanisms during a portion of each cycle of operation.

Figure 5:
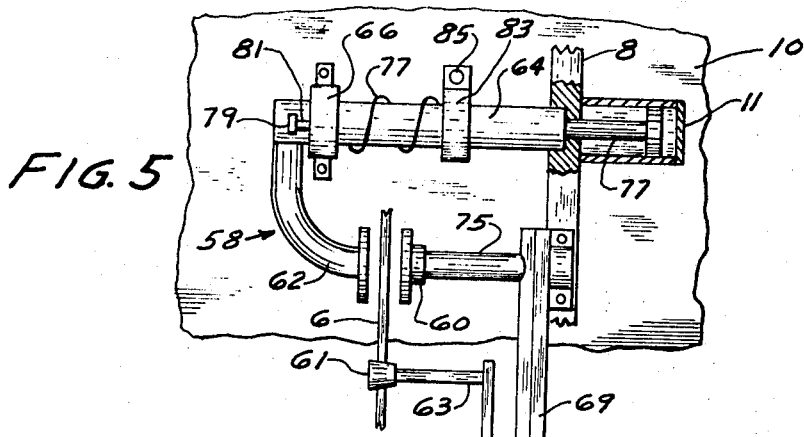
FIG. 5 is a top view of a portion of the vise clamp and indexing mechanism.

Referring now to the holding means for the circular saw blades shown in FIG. 5, the center of the saw blade is mounted on tapered member 61 that is rotatably and slideably mounted on pin 63 on arm 65. Arm 65 is fixed to a slide block 67. The slide block 67 is slideable on the saw blade arm 69. The slide block is clamped in a particular position by screw member 71. The base of saw blade arm 69 is connected to holding means 73 that is bolted to the vertical support member 8. Holding means 73 is adjustable to allow the distal end of arm 69 to be moved vertically about a pivot connection in holding means 73. The holding means includes clamping bolts to adjust the position of arm 69.

The outer edge of the circular saw blade 6 adjacent the teeth is firmly held in a grinding position by the biasing spring 77 that transmits the clamping force through vise clamp mechanism 58. The vise jaw mechanism includes a horizontally adjustable head 60 on support rod 75. The head 60 is moveable to the left and right on rod 75. The moveable arm 62 is moved to the left away from member 60 by vise clamp cylinder 11, and may be pivoted on rotatable rod 64 after having been moved to the left. The shaft 77 of vise clamp 11 moves the rod 64 to the left against the force of spring 77. The steady block 66 is connected to the horizontal base plate 10 to support the left end of moveable rod 64. The right end of the rod 64 is supported in a bearing surface in member 8. Affixed to the arm 62 is a flange portion 79 with a pin 81 that holds the vise clamp open when arm 62 is rotated out of alignment with the pin hole (not shown) in bracket 66. Bracket 83 rotates with the rod 64 and includes an adjustable pin 85 that strikes base plate 10 to limit rotation of arm 62 in order to align pin 81 with the matching hole in bracket 66.

Figure 6:
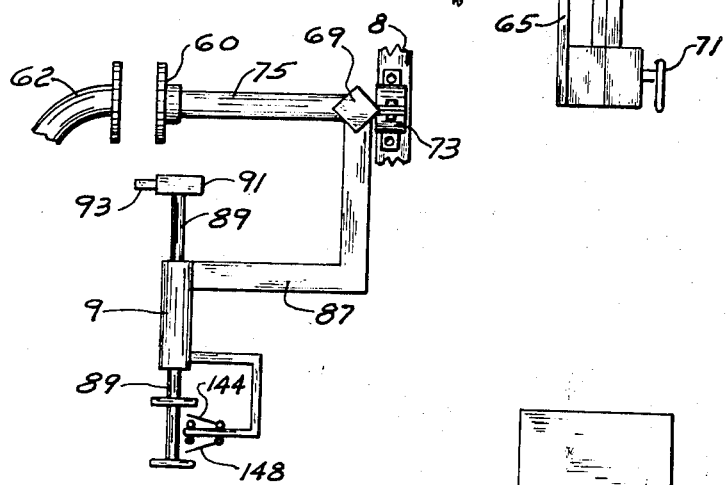
FIG. 6 is a side view of a portion of vise clamp and the indexing mechanism.

Referring now to FIG. 6, the index cylinder 9 is fixed to a L-shaped rod 87 that is connected to the saw blade support arm 69. The index cylinder 9 drives the shaft 89 up and down. The shaft 89 is moveable to a position adjacent the next tooth to be shaped. The solenoid 91 is then actuated to extend arm 93 just below the face of the next tooth to be shaped. As the shaft 89 is raised to it's final position, the arm 93 will engage face of the tooth to move the tooth to a particular grinding position. Pin 93 is retracted immediately as shaft 89 starts to move in a downward direction. The index mechanism positions each tooth prior to full clamping of vise clamp 58. The lower portion of shaft 89 may include two adjustable nuts that actuate switches 144 and 148. The solenoid 91 may be actuated by a switch (not shown) that is positioned just below switch 148.

It is to be noted that the shaft 89 may retract well below the face of the next saw tooth to be index. Pin 93 will not extend during the upward movement of shaft 89 until such time as solenoid 91 has been carried upward by shaft 89 to a position just below the tooth to be indexed to the grinding position.

Figure 3:
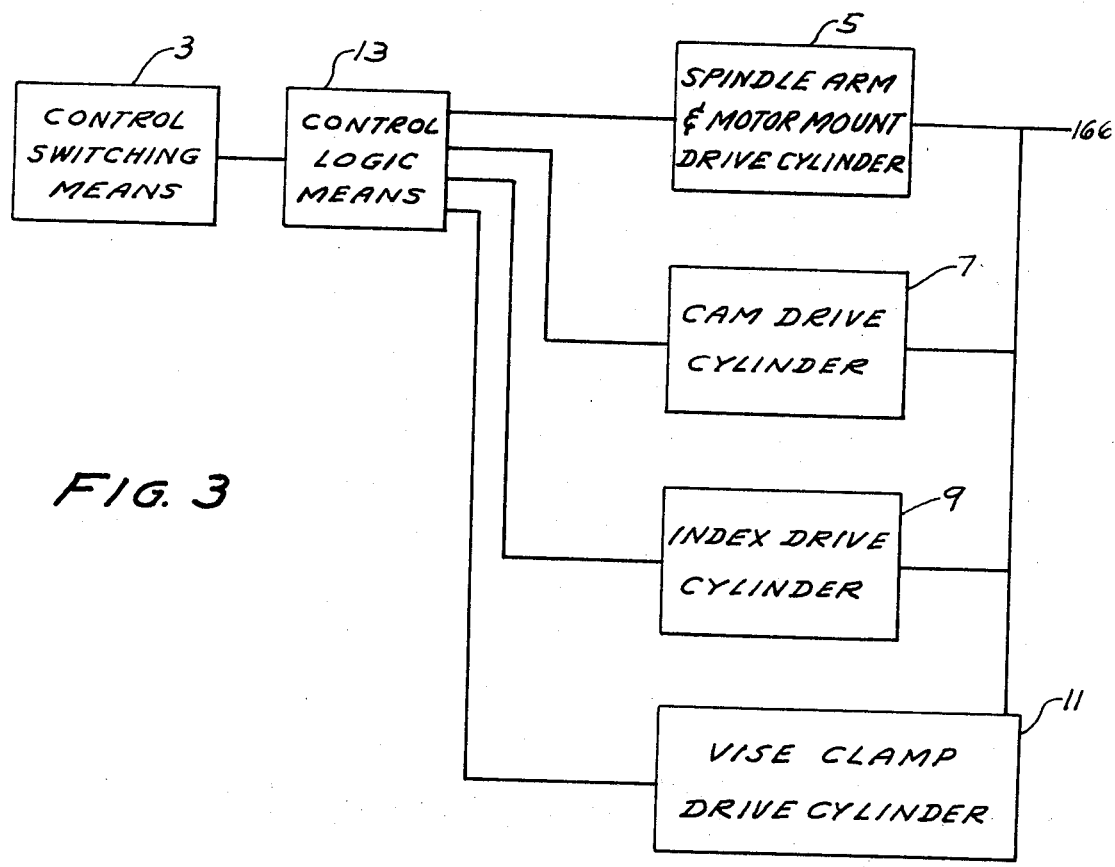
FIG. 3 is a block diagram of the control means for driving the automatic grinding machine.
Figure 4:
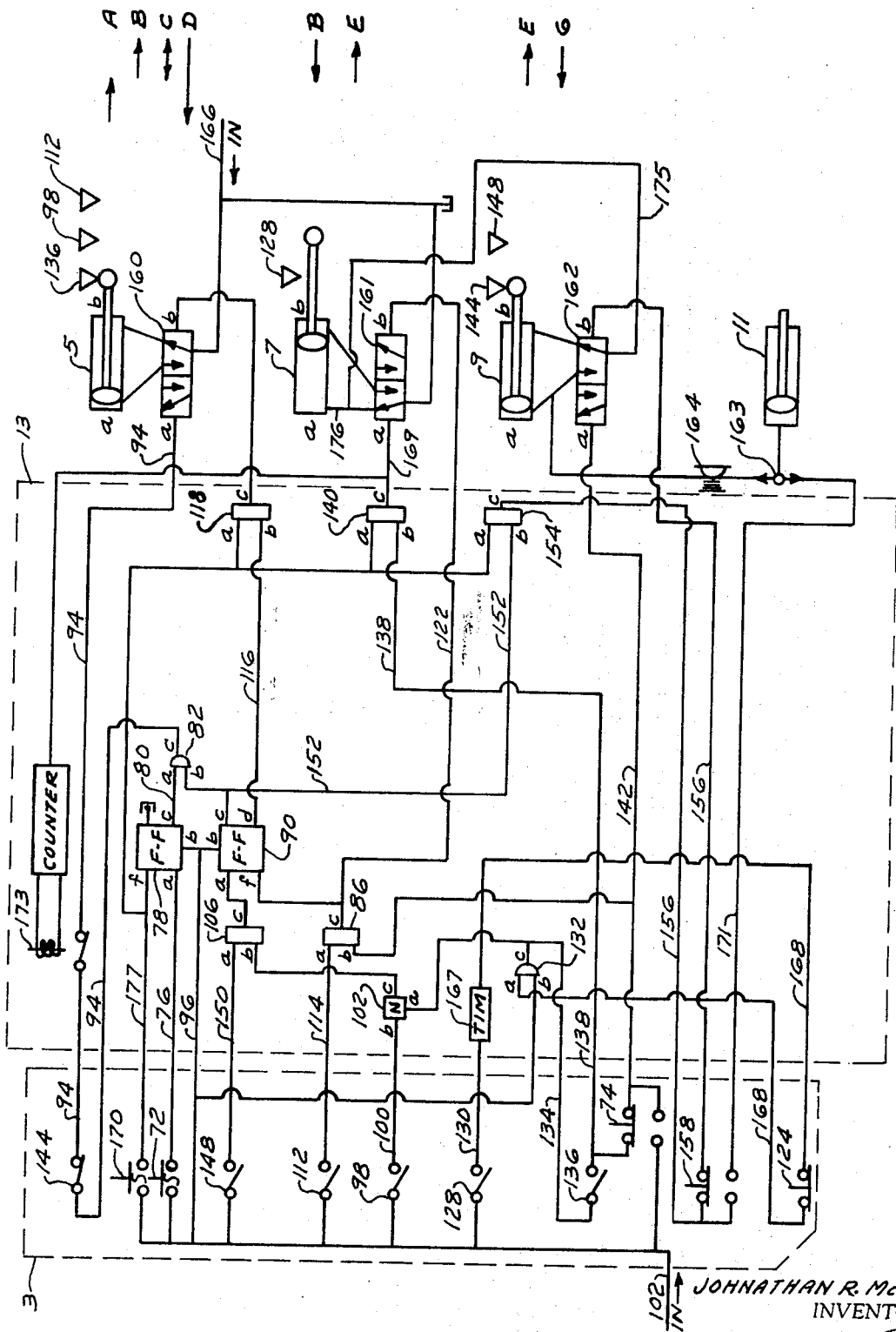
FIG. 4 is a schematic of the control means and drive cylinders for the automatic grinding machine.

The control system controls the sequence of operation and the movement of the spindle arms 18 and 20, the clearance cam 46, and the index means as they move through various cycles of operation. The control switch means, designated by numeral 3 in FIGS. 3 and 4, is connected to clean air in air pressure line 70. The control switch means is directly connected to control logic means 13 that controls the drive cylinders 5, 7, 9, and 11. The position of the drive cylinders controls various switches in the control switch means 3. The drive cylinders are connected to lubricated air in air pressure line 166.

Referring now to FIG. 4, the schematic drawing of the fluid control system illustrates the switching means 3 on the left side of the drawing, the cylinder drive units or drive cylinders 5, 7, 9, and 11 on the right side of the drawing, and the logic means 13 in the center of the drawing. Drive cylinders 5 reciprocately drives the grinding wheel spindle arms 18 and 20. Air drive cylinder 7 drives the clearance cam 46. Air drive cylinder 9 drives the indexing solenoid 91. Vise clamp drive cylinder 11 opens vise 58.

The automatic grinding machine is initially started by actuating start switch 72. Line pressure from supply line 70 passes through switch 72, and line 76 to flip-flop valve 78 at position A. When position A of the flip-flop valve 78 is pressurized, passage b-c is opened to allow line pressure from supply line 70 to pass through line 96, flip-flop 78, and line 80. Line pressure passes through line 80 to side A of and-valve 82 to open b-c of and-valve 82. Line pressure passes through line 96 through flip-flop-90. Flip-flop 90 was left in position A with b-c opened from the previous cycles of operation. Line pressure passes through line 96, flip-flop 90, line 152, and-valve 82, line 94, switch 144, line 94 to the a side of direction valve 160 of spindle arm drive cylinder 5. Air pressure at A of the direction valve 160 moves the direction valve to the right to allow line pressure to move through line 166, direction valve 160 to the A side of drive cylinder 5 causing drive cylinder 5 to extend to the right and open switch 136. Drive cylinder 5 will continue to the right to close switch 98.

When switch 98 is closed air pressure from line 70 passes through line 100 to the B side of not-valve 102 that is normally closed to pass line pressure to side C, and through lines 104 and 122. The pressure in line 104 passes through the B side of or-valve 106 and out of the C side, through line 108 to the A side of flip-flop valve 90. Energizing side A of flip-flop 90 maintains an open channel between sides B and C.

The line pressure passes through line 122 to the B side of direction valve 161 to drive the direction valve to the left which allow line pressure 166 to pass through to the B side of drive cylinder 7 to drive the cylinder 7 to the left or to return it to the left.

Drive cylinder 5 continues to the right until it engages and closes switch 112, line pressure 70 passes through switch 112, line 114, or-valve 86, line 88 to pilot side of flip-flop valve 90 to switch output pressure from line 152 to line 116. The line pressure from line 96 flows through flip-flop 90, line 116, or-valve 118, port C of valve 118 to pilot on the B side of direction valve 160 to drive the direction valve 160 to the left. By shifting direction valve 160 to the left, the air pressure from line 166 is shifted to the B side of cylinder 5 to drive the spindle arm cylinder in the opposite direction to the left. The spindle arm cylinder 5 will move to the left until it actuates switch 98. The reciprocal movement of cylinder 5, back and forth between switches 98 and 112 will continue as set forth here in above until the switch 98 is deactivated through the operation of not-valve 102, as explained here below. When the effect of switch 98 is inactivated, the spindle arm cylinder 5 will move to a start position in the extreme left position. It should be noted that the reciprocal movement of cylinder 5 continues until cam drive cylinder 7 moves all the way to the left and actuates switch 128.

When the cam drive cylinder moves to it's extreme left position and actuates switch 128, line pressure 70 passes through line 130, adjustable timer delay valve 167, after time delay through line 168, through normally closed spark out hold switch 124 to the pilot A side of and-valve 132. Side B of and-valve 132 is connected directly to line pressure 70 through line 96. The signal pressure at pilot A of and-valve 132 opens a channel between side B to C to allow line pressure to pass to A side of not-valve 102 and switch 136 through line 134.

When pressure actuates pilot A side of not-valve 102, the flow of pressure from line 100 through not-valve 102 to line 104 and 122, or-valve 106, line 108 to flip-flop valve 90 is blocked. This, however, allows flip-flop valve 90 to continue feeding line pressure 70 through line 96, flip-flop 90, line 116, or-valve 118 to the B side of direction valve 160 to drive spindle arm cylinder 5 to it's extreme left position. Therefore when cylinder 5 actuates switch 98 during it's movement to the left, the signal from switch 98 has been voided at not-valve 102, which in turn allows cylinder 5 to continue it's leftward travel rather than reciprocate rightward to switch 112.

With line pressure on switch 136, when spindle arm cylinder 5 reaches the extreme left side and actuates switch 136 into a closed position, line pressure passes through valve 136, line 138 to pilot A side of valve 161 to actuate cam drive cylinder 7 to the right; switch 74 and line 84 to insure continued operation of spindle arm cylinder 5 to the left; and switch 74 and line 142 to actuate the A pilot of valve 162. This allows line pressure, with a source via a "T" connection on line 176 between valve 161 and cylinder 7, to flow through line 175 to the pressure port of valve 162 through the A side of valve 162 to extend index cylinder 9 to the right.

Initially line pressure passes through switch 136, line 138, or-valve 140, line 169 to the A side of direction valve 161 to drive the direction valve to the right to place line pressure from line 166 at A side of cam drive cylinder 7. The cam drive cylinder 7 is then moved to the right deactivating switch 128. By opening switch 128, the line pressure on line 130, time delay 167, line 168, to and-valve 132 is killed. Therefore the deactivating signal to not-valve 102 is killed, and the pressure on switch 136, line 138, line 84 and 142 is also killed.

Initially line pressure passes through switch 136, switch 74 line 142 to the A side of direction valve 162 switches line pressure from line 166 via line 175 as mentioned above, from the B side to the A side of index drive cylinder 9 causing the index mechanism to react. As cylinder 9 starts it's movement to the right, it opens switch 144, this insures that no accidental signal may reach valve 160 causing cylinder 5 to extend until such time as the indexing mechanism via cylinder 9 has completely retracted and again closes switch 144.

When index cylinder 9 is moving to the right a blead line allows line pressure to move through regulator 164, shuttle valve 163 to drive jaw vise cylinder 11 to a partially open position against a spring biasing means. This allows the vise jaws to maintain braking pressure on the circular saw blade during the indexing cycle without overloading the indexing mechanism.

When index drive cylinder 9 moves to the extreme right position it closes switch 148 that passes line pressure through line 150, or-valve 106, line 108 to pilot on side A of flip-flop 90. This positions flip-flop valve 90 to feed line pressure from side B through side C into line 152.

With line pressure on line 152, the B side of and-valve 82 is activated to pass line pressure through and-valve 82, line 94, to switch 144 (if stop switch 170 has not been closed). Also line 152 passes line pressure through or valve 154, line 156, switch 158, line 156 to the B side of direction valve 162 to pass line pressure from line 166 in the B side of index drive cylinder 9 to return the drive cylinder 9 to it's extreme left position. When the drive cylinder is in the extreme left position switch 144 is closed to allow pressure to continue through line 94 to direction valve 160, begin repeating the cycle of operation on another tooth on the circular saw blade.

Switch 124 may be opened in order to extend the delay for spark out, that is to allow additional cycles of the spindle arm grinding wheels over a tooth at the end of a cycle. Switch 158 may be manually actuated to break line 156 to hold the index drive cylinder 9 in it's extended (left) position. The line pressure from line 70 will flow through line 171 to actuate shuttle valve 163 to allow jaw vise cylinder 11 to be opened completely. Manually returning switch 158 to it's normally closed position will vent line 171 thus allowing the vise jaws to be closed by spring action.

The device will continue to grind teeth and index teeth until a pre-set counter 172 indicates that all teeth have been ground and switch 173 is activated to open switch 174.

Stop switch 170 may be manually activated at any time during any cycle with the following results: line pressure 70 will pass through valve 170, line 177 to pilot side F of flip-flop 78 thereby stopping pressure from leaving flip-flop 78 via line 80, thereby opening and-valve 82. Also line pressure via line 177 by-passes flip-flop 78 going directly to the A sides of or-valves 118, 140, and 154. The ultimate reaction to this causes cylinder 5 to retract to the left or it's starting position, cylinder 7 to extend to the right and it's starting position, and cylinder 9 to retract to the left and it's starting position. All further automatic cycles are stopped.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A grinding machine for grinding at least one side of circular saw blade tips to provide side clearance angle comprising,
    a base member,
    two movable arms adjustable toward and away from one another, said arms movably connected to said base member.
    a grinding tool connected to each said arm,
    an adjustable clearance mechanism for guiding the grinding tool over saw blade tips,
    a follow means connected to said arms and positioned to contact said clearance mechanism for controlling the relative position of said grinding tools,
    a drive means connected to said arms to move said grinding tool over saw blade tips, and
    control means connected to the drive means, clearance mechanism, and said arms to control the grinding and spark out operation of said grinding machine.

2. A grinding machine as set forth in claim 1, wherein,
    said two arms are reciprocally movable,
    said drive means is connected to said clearance mechanism to move said clearance mechanism to vary the depth of said grinding tool;
    said control means moves said arms and said grinding tools through a plurality of cycles during a single cycle of said movable clearance mechanism.

3. A grinding machine as set forth in claim 1, including,
    a guide support for the said arms connected between said base member and said arms,
    said grinding tools are rotatable grinding wheels,
    and said clearance mechanism is a reciprocally moveable cam.

4. A grinding machine as set forth in claim 3 wherein, said arms are pendulum-type spindle arms rotatably supported on said guide support.

5. A grinding machine as set forth in claim 4, wherein,
    said control means moves said arms and said grinding wheels through a plurality of cycles during each cycle of said moveable clearance cam.

6. A grinding machine as set forth in claim 5, wherein,
    said arms are supported on a single guide support in the form of a rod,
    said drive means connected to said grinding wheels,
    said blade holding means connected to said base member to hold a saw blade tooth in a grinding position, and,
    an indexing mechanism for automatically rotating the saw blade to place the next tooth in a grinding position.

7. A grinding machine as set forth in claim 5, wherein,
    said control means automatically controls the reciprocal movement of the grinding wheel cycles, the spart out movement of the grinding wheels, the single cycle of the clearance cam and the single cycle of the index mechanism.

* * * * *